United States Patent
Grevers, Jr.

(10) Patent No.: US 7,907,930 B2
(45) Date of Patent: Mar. 15, 2011

(54) EMERGENCY ALERT SYSTEM DISTRIBUTION TO MOBILE WIRELESS TOWERS

(75) Inventor: Theodore R. Grevers, Jr., Milford, MA (US)

(73) Assignee: Cisco Technology, Inc., San Jose, CA (US)

( * ) Notice: Subject to any disclaimer, the term of this patent is extended or adjusted under 35 U.S.C. 154(b) by 612 days.

(21) Appl. No.: 11/778,157

(22) Filed: Jul. 16, 2007

(65) Prior Publication Data

US 2009/0023418 A1 Jan. 22, 2009

(51) Int. Cl.
*H04M 11/04* (2006.01)
(52) U.S. Cl. .................................. 455/404.1; 455/414.1
(58) Field of Classification Search .................. None
See application file for complete search history.

(56) References Cited

U.S. PATENT DOCUMENTS

| | | | |
|---|---|---|---|
| 7,177,623 B2 | 2/2007 | Baldwin | |
| 7,184,744 B1 | 2/2007 | Schnabel | |
| 7,209,955 B1 | 4/2007 | Major et al. | |
| 7,602,277 B1 * | 10/2009 | Daly et al. | 340/438 |
| 7,617,287 B2 * | 11/2009 | Vella et al. | 709/207 |
| 2003/0143974 A1 | 7/2003 | Navarro | |
| 2004/0150518 A1 | 8/2004 | Phillips et al. | |
| 2004/0259568 A1 * | 12/2004 | Patel | 455/456.1 |
| 2005/0013417 A1 | 1/2005 | Zimmers et al. | |
| 2006/0040639 A1 | 2/2006 | Karl et al. | |
| 2006/0223492 A1 | 10/2006 | Chin et al. | |
| 2007/0052533 A1 | 3/2007 | Glazer | |
| 2007/0129053 A1 | 6/2007 | Phillips et al. | |
| 2007/0136743 A1 | 6/2007 | Hasek et al. | |
| 2008/0085695 A1 * | 4/2008 | Vare et al. | 455/404.1 |
| 2008/0291849 A1 * | 11/2008 | Ostermeier et al. | 370/270 |
| 2010/0007487 A1 * | 1/2010 | Warner | 340/539.16 |

FOREIGN PATENT DOCUMENTS

EP 1 209 886 A2 6/2002
WO WO 2007/039890 A1 4/2007

* cited by examiner

*Primary Examiner* — Ajit Patel
(74) *Attorney, Agent, or Firm* — P. Su (57) ABSTRACT

In one embodiment, a method includes obtaining an object associated with a host server and determining if the object includes an indication that identifies a first zone. The method also includes identifying a message contained in the object if the object includes the indication that identifies the first zone, and creating a formatted notification if the object includes the indication. The formatted notification includes a representation of the message. Finally, the method includes broadcasting the formatted notification within a network.

24 Claims, 6 Drawing Sheets

EMERGENCY ALERT SYSTEM DISTRIBUTION TO MOBILE WIRELESS TOWERS

BACKGROUND OF THE INVENTION

The present invention relates generally to distributing messages or notifications to mobile or cellular devices within a particular zone.

Mobile wireless subscribers, or cellular subscribers, may exist anywhere within the range of a fixed mobile wireless tower or cellular tower. A mobile wireless tower associated with a service provider, e.g., a provider of wireless services, may send messages that are received by substantially all subscribers of the service provider within the range of the mobile wireless tower. However, the messages are not be received by users of mobile wireless devices that are not subscribed to the service provider, but are within the range of the mobile wireless tower associated with the service provider. In other words, messages broadcast by a mobile wireless tower operated by a service provider are generally received only by mobile wireless subscribers of the service provider who are within the vicinity or zone serviced by the mobile wireless tower.

DESCRIPTION OF THE EXAMPLE EMBODIMENTS

General Overview

In one embodiment, a method includes obtaining an object associated with a host server and determining if the object includes an indication that identifies a first zone. The method also includes identifying a message contained in the object if the object includes the indication that identifies the first zone, and creating a formatted notification if the object includes the indication. The formatted notification includes a representation of the message. Finally, the method includes broadcasting the formatted notification within a network. The message may be an emergency alert system (EAS) message that identifies an EAS state of emergency.

Description

The ability to efficiently distribute emergency alert system (EAS) messages within a zone that is likely to be affected by, or is associated with, an emergency allows those within the zone to take appropriate action. By providing mobile wireless or cellular towers with EAS messages, the towers may then propagate information associated with emergency alerts to substantially any mobile wireless device that is within a range covered or serviced by the towers. As a result, users of mobile wireless devices may be efficiently notified of emergency conditions or events.

A distribution method that allows EAS messages, as for example EAS text messages, to be provided to relevant mobile wireless or cellular towers enables the towers to effectively notify mobile wireless users within range of the towers regarding emergency states. In one embodiment, a distribution system allows a mobile tower to poll a trusted host or warning system origination point (WARSEP) to obtain appropriate objects that contain EAS messages. Appropriate objects for a mobile tower are generally objects that are targeted for the mobile tower, e.g., identify the location of the mobile tower or a zone serviced by the mobile tower.

A mobile wireless tower is a node or an element within an overall communications network that is arranged to receive information and to broadcast or otherwise deliver the information to mobile wireless devices within a range defined around the mobile wireless tower. A mobile wireless tower may include an arrangement that supports a network infrastructure, e.g., a transmission control protocol/internet protocol (TCP/IP) network infrastructure, which enables communications to occur between the mobile wireless tower and a host server such as a WARSEP. Using the network infrastructure, the mobile wireless tower may poll an appropriate location associated with the host server to identify any objects that include EAS information which is relevant to the mobile wireless tower.

Figure 1:
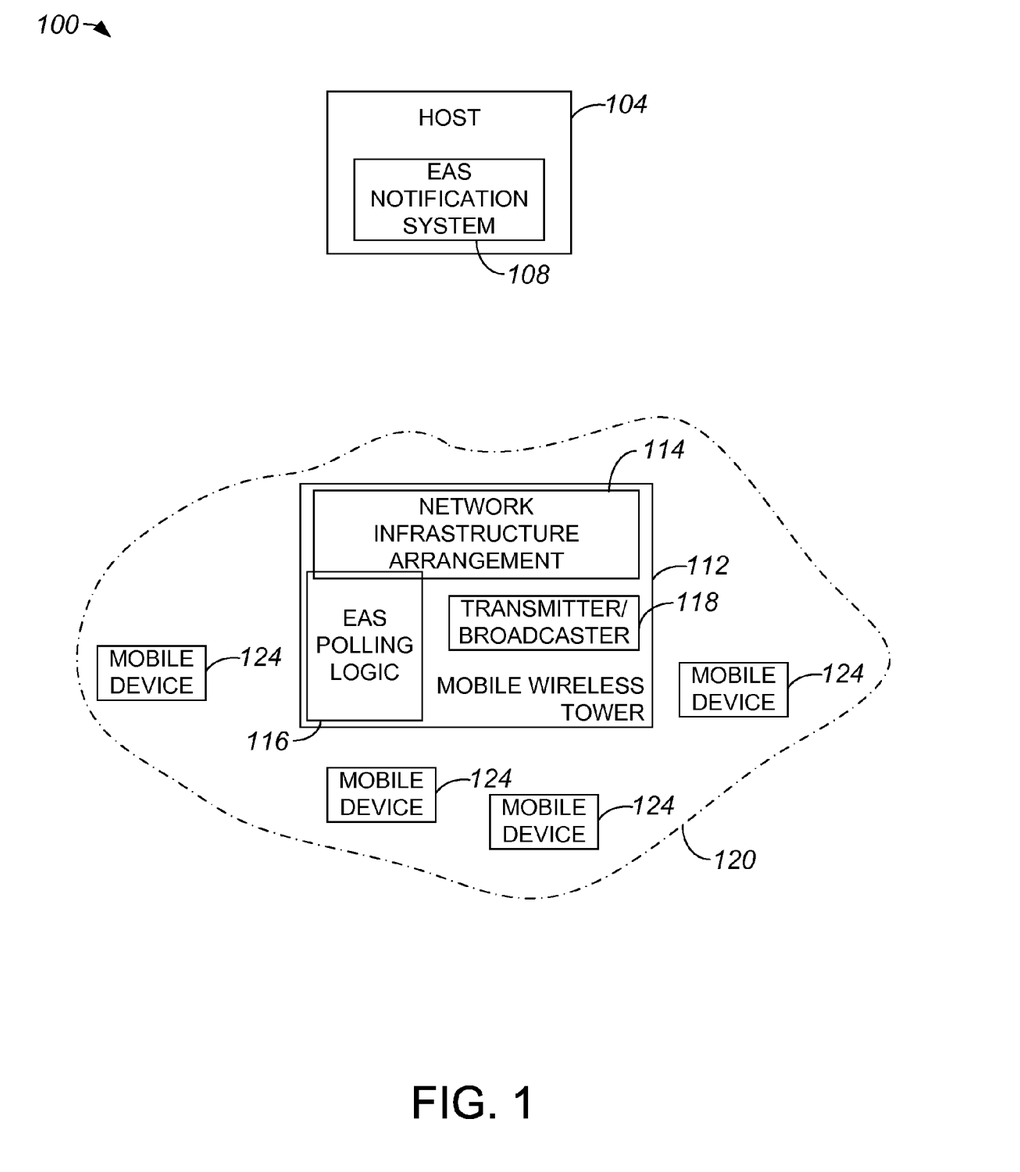
FIG. 1 is a block diagram representation of a network that allows for the distribution of emergency alert system (EAS) information to wireless devices in accordance with an embodiment of the present invention.

Referring initially to FIG. 1, a network that allows for the distribution of EAS information to a mobile wireless tower and subsequently to wireless devices will be described in accordance with an embodiment of the present invention. A network 100, which may be TCP/IP enabled in one embodiment, includes a host 104 and a mobile wireless tower 112. Host 104 is arranged to create or otherwise obtain emergency information and to create objects that contain EAS messages. Mobile wireless tower 112 is arranged to initiate requests, e.g., TCP/IP based requests, to host 104 for objects that contain EAS messages or announcements intended for mobile wireless tower 112.

Host 104, which may be a WARSEP, includes an EAS notification system 108. In general, EAS notification system 108 contains or is otherwise associated with objects that contain EAS messages. Objects that contain EAS messages may be created by EAS notification system 108. EAS notification system 108 may have an associated universal record locator (URL) address that may be accessed by mobile wireless tower 112 to fetch or otherwise obtain the objects.

Mobile wireless tower 112 includes a network infrastructure arrangement 114 that provides networking capability, e.g., enables mobile wireless tower 112 to poll host 104. EAS polling logic 116, which may include hardware and/or executable software logic embodied in a tangible medium, provides mobile wireless tower 112 with polling functionality. By way of example, EAS polling logic 116 polls EAS notification system 108 and processes objects obtained from EAS notification system 108 to generate notifications that may be transmitted by a transmitter/broadcaster 118. EAS polling logic 116 will be described below with respect to FIG. 2. In one embodiment, EAS polling logic 116 may be included at least partially within network infrastructure arrangement 114.

Mobile wireless tower 112, which is typically located at a substantially fixed location, has an associated range or zone 120. In one embodiment, zone 120 may be a defined geographic region. Any roaming or mobile devices 124 which are located within zone 120 are such that when mobile devices 124 are "on," active, or otherwise available, mobile devices 124 may receive communications from mobile wireless tower 112. Transmitter/broadcaster 118 is configured to provide notifications relating to EAS messages or announcements to mobile devices 124. In one embodiment, notifications are provided as text messages. It should be appreciated, however, that notifications are not limited to being provided as text messages. The notifications are effectively targeted to mobile devices 124 within zone 120 such that mobile devices (not shown) that are not within zone 120 do not receive the notifications.

Figure 2:
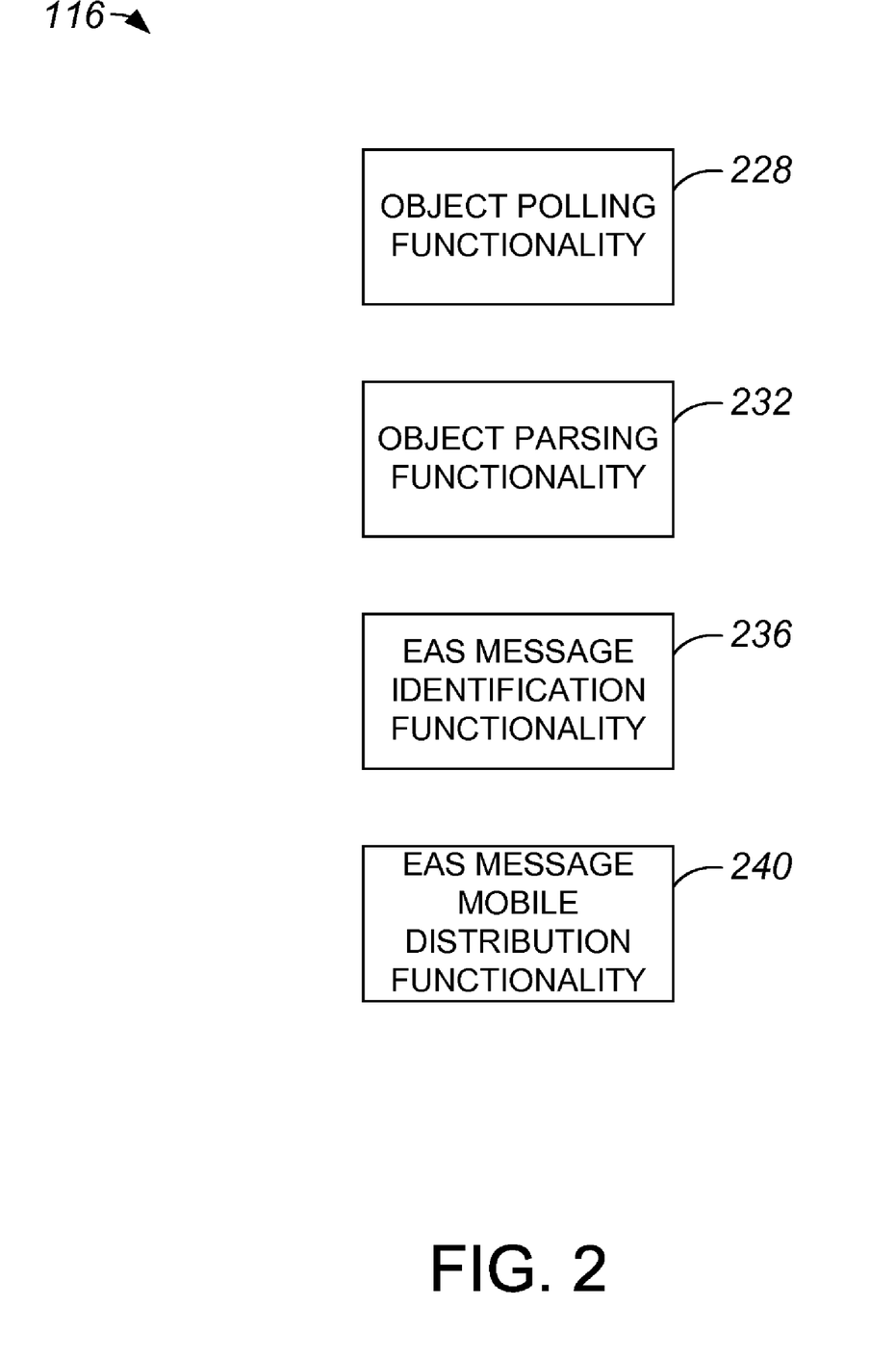
FIG. 2 is a block diagram representation of EAS polling logic, i.e., EAS polling logic 116 of FIG. 1, in accordance with an embodiment of the present invention.

EAS polling logic 116 generally includes functionality or components, e.g., blocks of logic, that allow objects to be fetched from host 104 and processed. FIG. 2 is a block diagram representation EAS polling logic 116 in accordance with an embodiment of the present invention. EAS polling logic 116 includes object polling functionality 228, object parsing functionality 232, EAS message identification functionality 236, and EAS message mobile distribution functionality 240. Object polling functionality 228 is configured to poll a host, e.g., host 104 of FIG. 1, or to initiate requests to the host for objects that are targeted to the mobile wireless tower that includes EAS polling logic 116. Polling a host may include accessing a URL defined by the host. Object parsing functionality 232 parses an object obtained from a host, or otherwise studies the contents of the object.

EAS message identification functionality 236 may utilize information identified by object parsing functionality 232 to determine if the information indicates that a particular object contains an EAS message or announcement. That is, EAS message identification functionality 236 identifies whether the contents of an object are an EAS message intended for a zone in which the mobile wireless tower that includes EAS polling device 116 is located, i.e., a targeted zone.

EAS message mobile distribution functionality 240 is configured to distribute an EAS message obtained from a host to mobile wireless devices located in a targeted zone. In one embodiment, EAS message mobile distribution functionality 240 creates a text message for distribution to substantially all available mobile wireless devices in a targeted zone of a mobile network.

Figure 3:
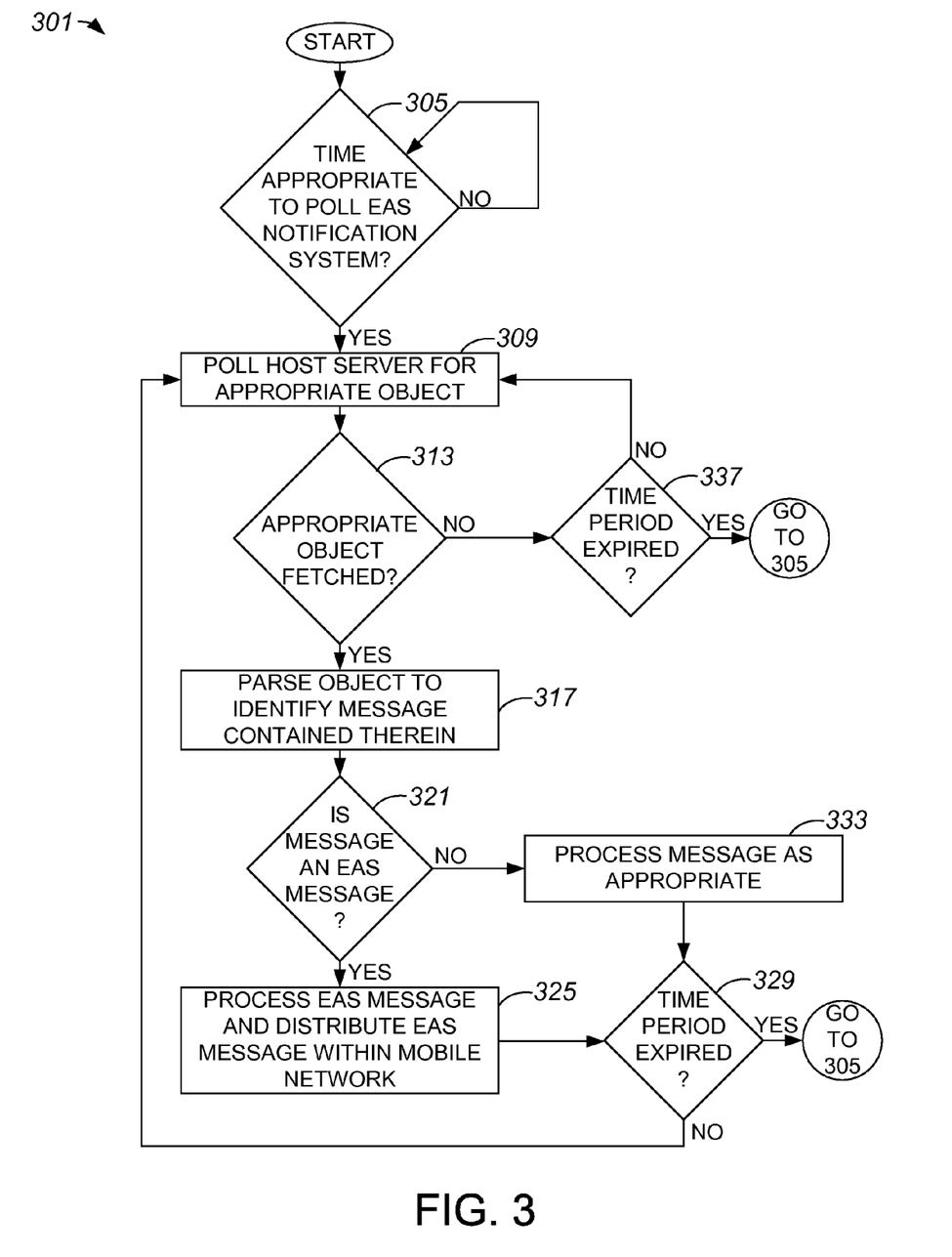
FIG. 3 is a process flow diagram which illustrates a method of obtaining EAS notification messages for distribution within a mobile network in accordance with an embodiment of the present invention.

With reference to FIG. 3, the operation of a cellular or mobile wireless tower will be described. FIG. 3 is a process flow diagram which illustrates a process of obtaining EAS notification messages for distribution within a mobile network in accordance with an embodiment of the present invention. A process 301 of obtaining EAS notification messages begins at step 305 in which it is determined, typically by logic associated with a mobile wireless tower or similar arrangement, whether it is an appropriate time to poll an EAS notification system for messages. In one embodiment, a mobile wireless tower may periodically poll an EAS notification system for messages at predetermined intervals. Hence, an appropriate time to poll the EAS notification system may be when a predetermined interval has essentially elapsed since the last time the EAS notification system was polled. It should be appreciated, however, that an appropriate time to poll the EAS notification system may be substantially any time an administrator associated with a mobile wireless tower determines that polling an EAS notification system is desired, e.g., during severely inclement weather or after the administrator personally becomes aware of an emergency event.

If it is determined in step 305 that the time is not appropriate to poll an EAS notification system, process flow effectively returns to step 305 in which another determination is made as to whether it is currently an appropriate time to poll the EAS notification system. Alternatively, if the determination in step 305 is that the time is appropriate to poll an EAS notification system, the host server associated with the EAS notification system is polled in step 309 for an appropriate object. Polling the host server may include initiating a TCP/IP based request for a pre-defined object that is associated with the mobile wireless tower, i.e., the mobile wireless tower that initiated the TCP/IP based request. Polling the host server may also include polling a URL associated with the host server, as previously mentioned. An appropriate object may be substantially any object that identifies the mobile wireless tower or a zone associated with the mobile wireless tower. In one embodiment, a mobile wireless tower may have a zone code or identifier, and an appropriate object may be an object that contains the zone code or identifier. One particular method of polling a host server will be described below with reference to FIG. 4.

In step 313, it is determined whether an appropriate object has been fetched or otherwise obtained. That is, it is determined whether polling has resulted in the identification of an object that identifies, or is intended for, the mobile wireless tower. If it is determined that an appropriate object has not been fetched, the indication may be that there are effectively no appropriate objects to be fetched, and that a polling process has ended without locating any appropriate objects. The indication may instead be that an appropriate object has not yet been fetched during a continuing polling process, e.g., during a polling process that involves periodic checks to determine if an appropriate object has been fetched. As such, in step 337, it is determined if a time period has expired. The time period may be a period of time allocated to poll the host server for an appropriate object or appropriate objects. In one embodiment, if an appropriate object is not located within the time period, the implication is that there are presently no appropriate objects to fetch.

If it is determined in step 337 that the time period has expired, process flow returns to step 305 in which it is determined if the time is appropriate to poll an EAS notification system. Alternatively, if it is determined in step 337 that the time period has not expired, then the indication is that a polling process is still ongoing. As such, process flow moves from step 337 to step 309 in which the host server is polled for an appropriate object.

Returning to step 313, it if is determined that an appropriate object has been fetched, then the fetched object is parsed in step 317 to identify the message contained or otherwise included in the fetched object. By way of example, the fetched object is effectively examined to identify its contents or its payload. Once the fetched object is parsed, a determination is made in step 321 as to whether the message contained in the object is an EAS message or an EAS notification. A determination of whether the message contained in the object is an EAS message may include, but is not limited to including, reading and interpreting the contents of the message, and/or determining if an indicator stored in or with the message identifies the message as an EAS message.

If the determination in step 321 is that the message is an EAS message, then the indication is that the EAS message is to be provided to substantially all appropriate devices, e.g., mobile wireless devices which are "on" or otherwise available to receive the EAS message, within a mobile network associated with the mobile wireless tower. Accordingly, in step 325, the EAS message is processed and distributed within the mobile network. The steps associated with one method of processing and distributing an EAS message within a mobile network will be discussed below with respect to FIG. 5.

After the EAS message is processed and distributed, it is determined in step 329 whether a time period associated with polling a host server is expired. As previously mentioned, the time period may be a period of time allocated to poll the host server for an appropriate object or appropriate objects, i.e., the duration of a polling process. If it is determined in step 329 that the time period has expired, process flow returns to step 305 in which it is determined if the time is appropriate to poll an EAS notification system. Alternatively, if it is determined in step 329 that the time period has not expired, then the indication is that a polling process is still ongoing, and process flow returns to step 309 in which the host server is polled for an appropriate object.

Returning to step 321, if it is determined that the message identified in the fetched or acquired object is not an EAS message, the message is processed in step 333 as appropriate. By way if example, if the message is a test message intended to verify whether a polling process is working, the mobile wireless tower may send a return message to the host server that indicates that the polling process is working. From step 333, process flow moves to step 329 in which it is determined if a time period has expired.

Figure 4:
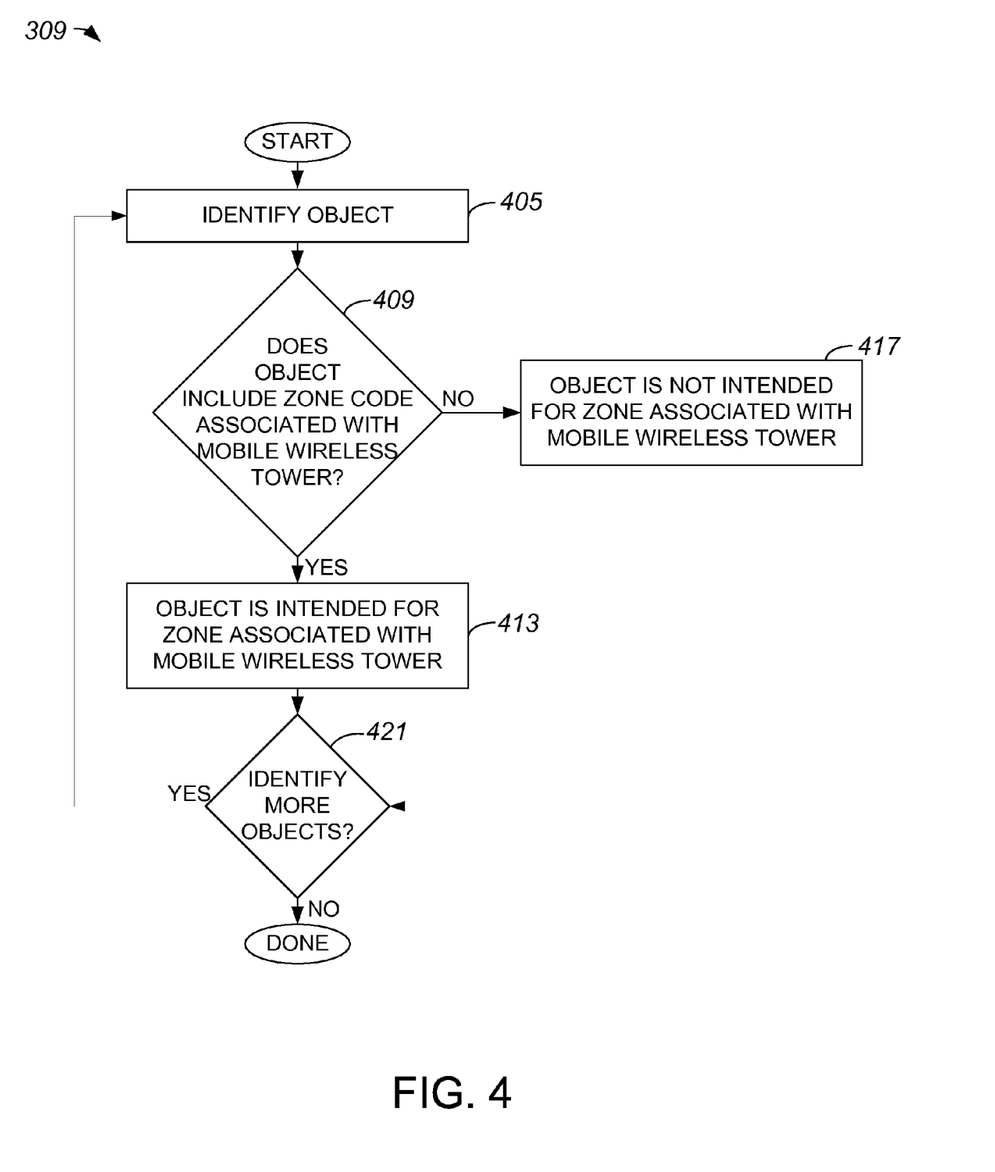
FIG. 4 is a process flow diagram which illustrates a method of polling a host server for an appropriate object, i.e., step 309 of FIG. 3, in accordance with an embodiment of the present invention.

Referring next to FIG. 4, the polling of a host server by a mobile wireless tower or similar arrangement will be described. FIG. 4 is a process flow diagram which illustrates one method of polling a host server for an appropriate object, i.e., step 309 of FIG. 3, in accordance with an embodiment of the present invention. A process 309 of polling a host server for an appropriate object begins at step 405 in which an object stored or otherwise associated with the host server is identified. An object may be identified, for example, by monitoring objects associated with a URL associated with the host server. In the described embodiment, for purposes of discussion, it is assumed that there is at least one object that is stored or otherwise associated with the host server. It should be appreciated, however, that there may not necessarily be an object to identify. If there is no object to identify, the process of polling a host server for an appropriate object may terminate.

After the object is identified, it is determined in step 409 whether the object includes a code for the zone or the area associated with, e.g., covered by the range of, the mobile wireless tower. If it is determined that the object does not include an appropriate zone code for the mobile wireless tower, the object is effectively identified in step 417 as not being intended for, i.e., not targeted for, the zone associated with the mobile wireless tower. Once the object is identified as not intended for the zone associated with the mobile wireless tower, it is determined in step 421 whether there are potentially more objects to identify. There may be more objects to identify if a time period for identifying objects has not elapsed or expired. Hence, in one embodiment, a determination of whether there may be more objects to identify may include determining if a time period for identifying objects has elapsed or expired.

If it is determined in step 421 that an attempt is to be made to identify more objects, the process flow returns to step 405 in which another object is identified. Alternatively, if it is determined that no more objects are to be identified, the indication may be that a time period for identifying objects has elapsed or expired. The indication may also be that a polling process specifies a threshold number of objects to be identified during the polling process, and that the threshold number has been reached. In other words, a polling process may specify substantially only a certain number of objects to be identified during the polling process, and the indication may be that the certain number has been met. As such, if no more objects are to be identified, the process of polling a host server is completed.

Figure 5:
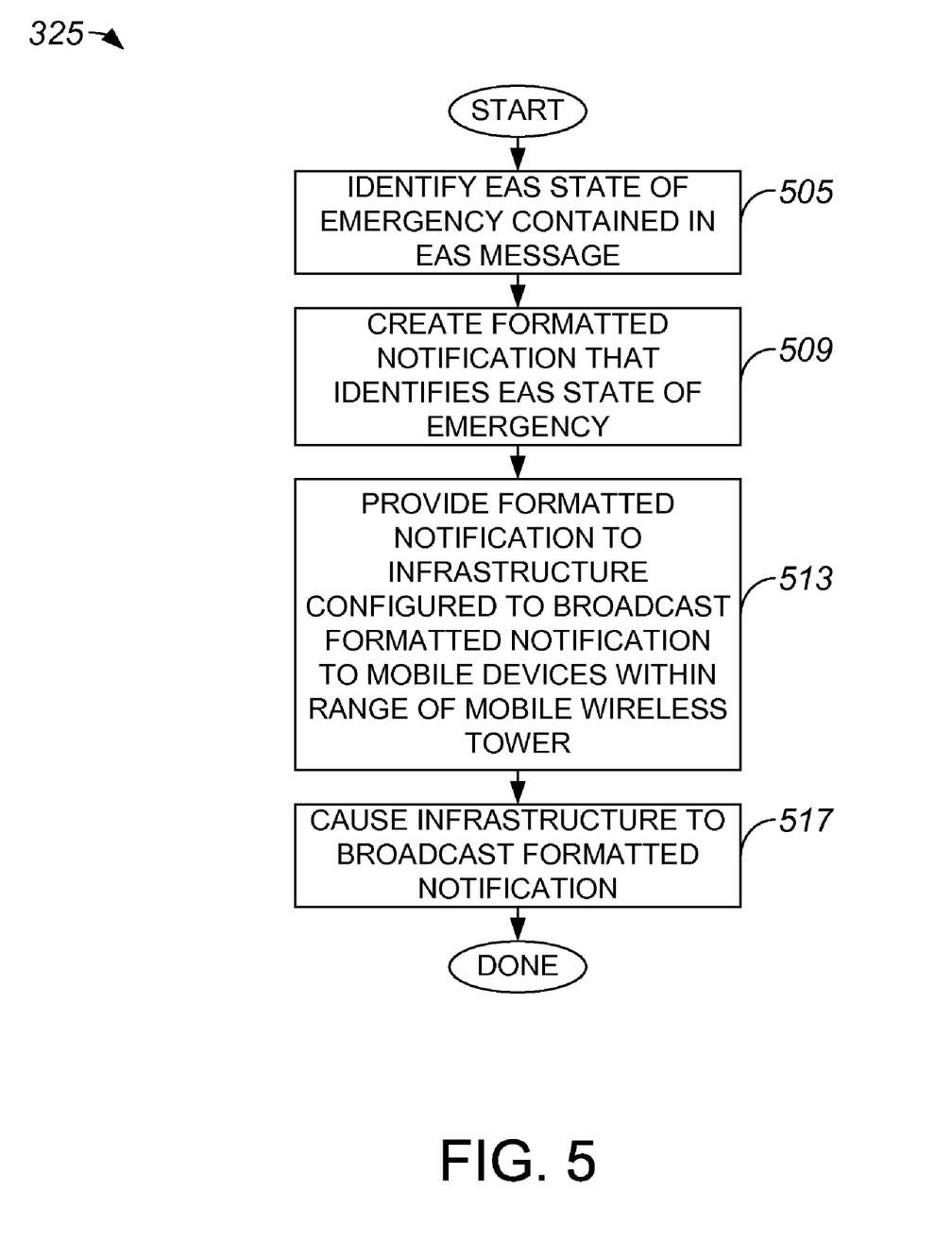
FIG. 5 is a process flow diagram which illustrates a method of processing an EAS message, i.e., step 325 of FIG. 3, in accordance with an embodiment of the present invention.

FIG. 5 is a process flow diagram which illustrates a method of processing an EAS message, i.e., step 325 of FIG. 3, in accordance with an embodiment of the present invention. A process 325 of processing an EAS message obtained by a mobile wireless tower begins at step 505 in which the mobile wireless tower identifies the EAS state of emergency contained in the EAS message. The state of emergency may specify, but is not limited to specifying, a warning or notification relating to weather, a warning or notification relating to a natural disaster, a warning or notification relating to an attack such as a war, a warning or notification relating to criminal activity such as a kidnapping, or a warning or notification relating to a government identified event. By way of example, a state of emergency contained in an EAS message may be weather emergency relating to a blizzard warning.

After the state of emergency contained in an EAS message is identified, a formatted notification is created in step 509. The formatted notification is arranged to identify the state of emergency. The formatted notification, in one embodiment, may be arranged to provide a relatively short, formatted text message that includes information about the state of emergency and is suitable for display on a mobile wireless device. By way of example, a formatted notification may be in a format that is suitable for a short message service (SMS) broadcast.

Once the formatted notification is created, the formatted notification is provided in step 513 to an infrastructure that is configured to broadcast the formatted notification. In general, the infrastructure may be a network infrastructure configured to broadcast the formatted notification to substantially all mobile devices that are within a zone or a range supported by the wireless mobile tower. The network infrastructure associated with the wireless mobile tower may support TCP/IP or substantially any suitable network-related protocol. From step 513, process flow moves to step 517 in which the mobile wireless tower effectively causes the infrastructure to broadcast the formatted notification. Once the formatted notification is broadcasted, the processing of an EAS message is completed.

Figure 6:
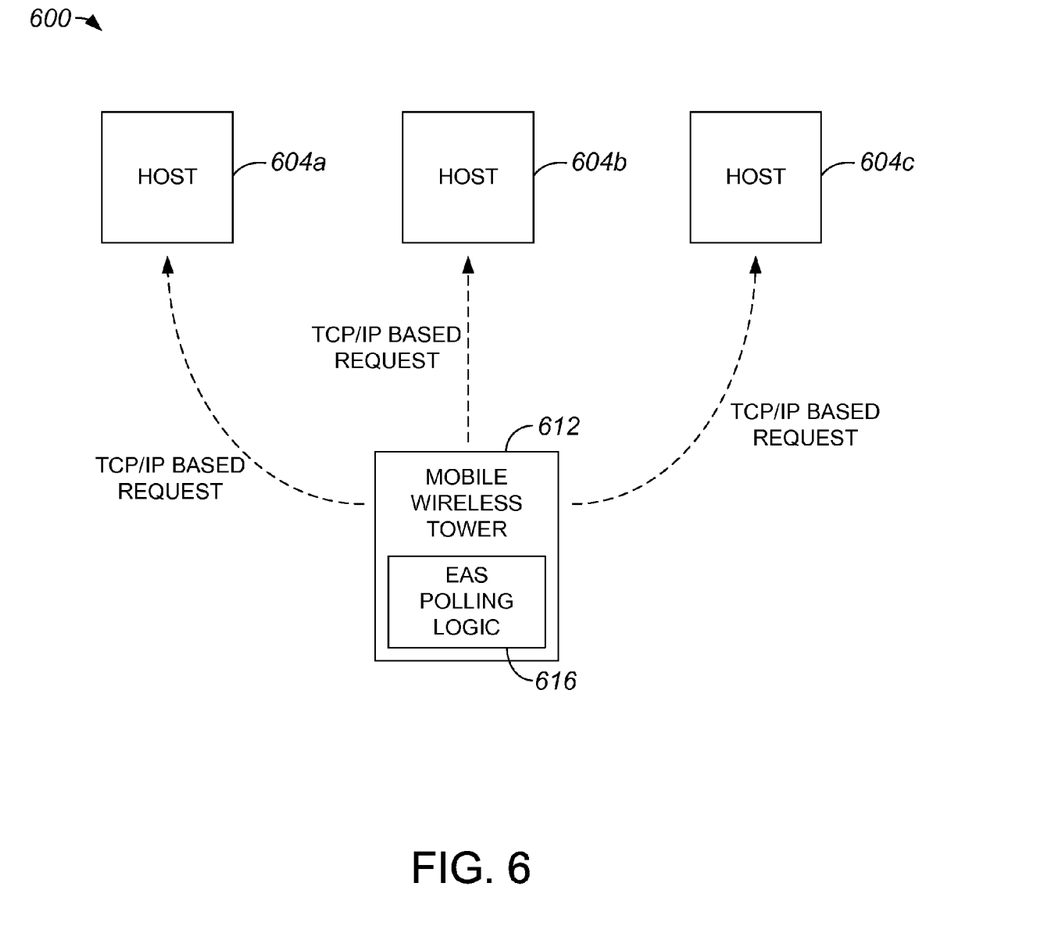
FIG. 6 is a block diagram representation of an overall network in which a mobile wireless tower obtains objects that contain EAS messages from multiple hosts in accordance with an embodiment of the present invention.

In general, a mobile wireless tower may obtain objects that contain EAS message from different host servers or WARSEPs. That is, a mobile wireless tower may be configured to poll more than one host server or WARSEP associated with an overall network. FIG. 6 is a block diagram representation of an overall network in which a mobile wireless tower obtains objects that contain EAS messages from multiple hosts in accordance with an embodiment of the present invention. A network 600, which may be associated with a TCP/IP network infrastructure, includes multiple hosts 604*a-c* and a mobile wireless tower 612. EAS polling logic 616 of mobile wireless tower 612 may initiate TCP/IP based requests for objects relevant to or targeted to mobile wireless tower 612. The TCP/IP based requests may be sent to each host 604*a-c* either substantially simultaneously or in sequence. In the described embodiment, hosts 604*a-c* may be interconnected, although it should be appreciated that hosts 604*a-c* may each be arranged to be in communication with mobile wireless tower 612 but not with each other.

Although only a few embodiments of the present invention have been described, it should be understood that the present invention may be embodied in many other specific forms without departing from the spirit or the scope of the present invention. By way of example, while a mobile wireless tower may broadcast or otherwise transmit information relating to an EAS message to substantially all available mobile wireless devices within a range or zone associated with the mobile wireless tower, the mobile wireless tower may instead substantially only broadcast to registered mobile wireless devices. In other words, a mobile wireless tower may be configured to broadcast EAS states of emergency or other emergency communications to substantially only those mobile wireless devices that are known to be within the range of the mobile wireless tower.

A host server from which objects may be fetched or otherwise obtained by a mobile wireless tower may generally be associated with any organization or entity that provides or manages notifications regarding emergencies and the like. For instance, a mobile wireless tower may poll a host server operated by the National Weather Service in an attempt to locate any objects that contain alerts for a zone in which the mobile wireless tower is located.

A mobile wireless tower may be arranged such that EAS messages obtained by the mobile wireless tower are effectively distributed to substantially only subscribers to services provided by an owner or operator of the mobile wireless tower. Alternatively, a mobile wireless tower may be arranged to essentially propagate EAS emergency alerts even to non-subscribers of services provided by the owner or operator. In one embodiment, if a mobile wireless tower is controlled by an agency that also controls a host server, the mobile wireless tower may distribute EAS emergency alerts obtained form the host server to substantially any available mobile wireless device within the range of the mobile wireless tower without departing from the spirit or the scope of the present invention.

A network infrastructure associated with a mobile wireless tower has been described as being a TCP/IP enabled network infrastructure. However, a network infrastructure is not limited to being a TCP/IP enabled network infrastructure. It should be appreciated any suitable network infrastructure may be used to enable EAS messages to be obtained by a mobile wireless tower.

The steps associated with the methods of the present invention may vary widely. Steps may be added, removed, altered, combined, and reordered without departing from the spirit or the scope of the present invention. Therefore, the present examples are to be considered as illustrative and not restrictive, and the invention is not to be limited to the details given herein, but may be modified within the scope of the appended claims.

The invention claimed is:

1. A method comprising:
   obtaining an object associated with a host server, the object being obtained by a distribution arrangement;
   determining if the object includes an indication that identifies a first zone, the first zone being associated with the distribution arrangement;
   identifying a message contained in the object if it is determined that the object includes the indication that identifies the first zone;
   creating a formatted notification if the object includes the indication that identifies the first zone, wherein the formatted notification includes a representation of the message; and
   broadcasting the formatted notification from the distribution arrangement within only the first zone, the first zone being included in a network.

2. The method of claim 1 wherein identifying the message includes determining if the message is an emergency alert system (EAS) message, and wherein creating the formatted notification includes creating the formatted notification if the message is the EAS message.

3. The method of claim 2 wherein broadcasting the formatted notification includes broadcasting the formatted notification to substantially all available wireless mobile devices located in the first zone.

4. The method of claim 2 wherein the representation of the message is a representation of an EAS state of emergency contained in the EAS message, and broadcasting the formatted notification within the network includes broadcasting the representation of the EAS state of emergency.

5. A method comprising:
   obtaining an object associated with a host server, wherein obtaining the object associated with the host server includes polling the host server to obtain the object;
   determining if the object includes an indication that identifies a first zone in a network;
   identifying a message contained in the object if the object includes the indication that identifies the first zone
   creating a formatted notification if the object includes the indication that identifies the first zone, wherein the formatted notification includes a representation of the message; and
   broadcasting the formatted notification within the first zone in the network.

6. The method of claim 4 wherein polling the host server to obtain the object includes sending a TCP/IP request to the host server.

7. The method of claim 1 wherein identifying the message includes parsing the object.

8. Logic embodied on non-transitory computer-readable media that, when executed, is operable to:
   obtain an object associated with a host server, the object being obtained by a distribution arrangement;
   determine if the object includes an indication that identifies a first zone, the first zone being associated with the distribution arrangement;
   identify a message contained in the object if it is determined that the object includes the indication that identifies the first zone;
   create a formatted notification if the object includes the indication that identifies the first zone, wherein the formatted notification includes a representation of the message; and
   broadcast the formatted notification from the distribution arrangement within only the first zone, the first zone being included in a network.

9. The logic of claim 8 wherein the logic operable to identify the message is further operable to determine if the message is an emergency alert system (EAS) message, and the logic operable to create the formatted notification is further operable to create the formatted notification if the message is the EAS message.

10. The logic of claim 9 wherein the logic operable to broadcast the formatted notification is further operable to broadcast the formatted notification to substantially all available wireless mobile devices located in the first zone.

11. The logic of claim 9 wherein the representation of the message is a representation of an EAS state of emergency contained in the EAS message, and the logic operable to broadcast the formatted notification within the network is further operable to broadcast the representation of the EAS state of emergency.

12. The logic of claim 8 wherein the logic operable to obtain the object associated with the host server is further operable to poll the host server to obtain the object.

13. An apparatus comprising:
- means for obtaining an object associated with a host server, the object being obtained by a distribution arrangement;
- means for determining if the object includes an indication that identifies a first zone, the first zone being associated with the distribution arrangement;
- means for identifying a message contained in the object if it is determined that the object includes the indication that identifies the first zone;
- means for creating a formatted notification if the object includes the indication that identifies the first zone, wherein the formatted notification includes a representation of the message; and
- means for broadcasting the formatted notification from the distribution arrangement within only the first zone, the first zone being included in a network.

14. The apparatus of claim 13 wherein the means for identifying the message include means for determining if the message is an emergency alert system (EAS) message, and wherein the means for creating the formatted notification include means for creating the formatted notification if the message is the EAS message.

15. The apparatus of claim 14 wherein the means for broadcasting the formatted notification include means for broadcasting the formatted notification to substantially all available wireless mobile devices located in the first zone.

16. The apparatus of claim 14 wherein the representation of the message is a representation of an EAS state of emergency contained in the EAS message, and the means for broadcasting the formatted notification within the network include means for broadcasting the representation of the EAS state of emergency.

17. The apparatus of claim 13 wherein the means for obtaining the object associated with the host server include means for polling the host server to obtain the object.

18. An apparatus comprising:
- a network infrastructure arrangement;
- logic, the logic being arranged to obtain an object associated with a host server through the network infrastructure arrangement, the logic further being arranged to identify a message contained in the object and to create a representation of the message, the logic still further being arranged to determine if the object includes an indication that identifies a first zone, and to identify the message contained in the object if the object includes the indication that identifies the first zone; and
- a transmitter, the transmitter being arranged to transmit the representation of the message through the first zone.

19. The apparatus of claim 18 wherein the apparatus is a mobile wireless tower.

20. The apparatus of claim 19 wherein the network infrastructure arrangement is associated with a TCP/IP enabled network infrastructure arrangement.

21. The apparatus of claim 18 wherein the logic further arranged to identify the message contained in the object is further arranged to determine if the message is an emergency alert system (EAS) message.

22. The apparatus of claim 21 wherein if the message is determined to be the EAS message, the representation of the message identifies an EAS state of emergency.

23. The apparatus of claim 22 wherein the transmitter is arranged to transmit the representation of the message to available wireless mobile devices within a range associated with the apparatus.

24. The apparatus of claim 23 wherein the transmitter is arranged to transmit the representation of the message to all available wireless mobile devices within the range.

* * * * *